United States Patent [19]

Freigang

[11] Patent Number: 5,244,027
[45] Date of Patent: Sep. 14, 1993

[54] VENT FOR VEHICLE TIRE INFLATION SYSTEM

[75] Inventor: Alan R. Freigang, Zeeland, Mich.

[73] Assignee: Eaton Corporation, Cleveland, Ohio

[21] Appl. No.: 753,539

[22] Filed: Sep. 3, 1991

[51] Int. Cl.$^5$ ............................................. B60C 23/00
[52] U.S. Cl. ................................... 152/416; 137/224
[58] Field of Search .................. 152/415, 416, 417; 137/224

[56] References Cited

U.S. PATENT DOCUMENTS

| | | | |
|---|---|---|---|
| 4,782,879 | 11/1988 | Le Chatelier et al. | 152/417 |
| 4,883,105 | 11/1989 | Schultz | 152/416 |
| 4,893,664 | 1/1990 | Oltean | 152/416 |
| 4,922,946 | 5/1990 | Boulicault | 152/416 X |

Primary Examiner—Caleb Weston
Assistant Examiner—Francis J. Lorin
Attorney, Agent, or Firm—P. S. Rulon

[57] ABSTRACT

A tire pressure control system (10) for wheels (28) of a vehicle. The system includes an air control circuit (40) having a positive pressure air source (42), a vacuum pressure air source (44), a central control unit (46), a vehicle speed sensor (47), and a command/display console (48). The control circuit (40) includes valves (62,64,66,68,70) and a conduit assembly (74) for controlling communication of the positive and vacuum pressure air to wheel valve assemblies (14) mounted on each wheel. A vent valve (86) provides quick venting of positive air pressure in the conduit assembly (74) for effecting rapid closing of a valve device (100) in each wheel valve (14). Each wheel valve also includes a valve device (104) providing substantially unrestricted air flow from the conduit assembly (74) to the wheels when valve device (100) is open and providing restricted air flow from the wheels to the conduit assembly (74) to ensure closing of the valve device (100) when the conduit is vented.

2 Claims, 4 Drawing Sheets

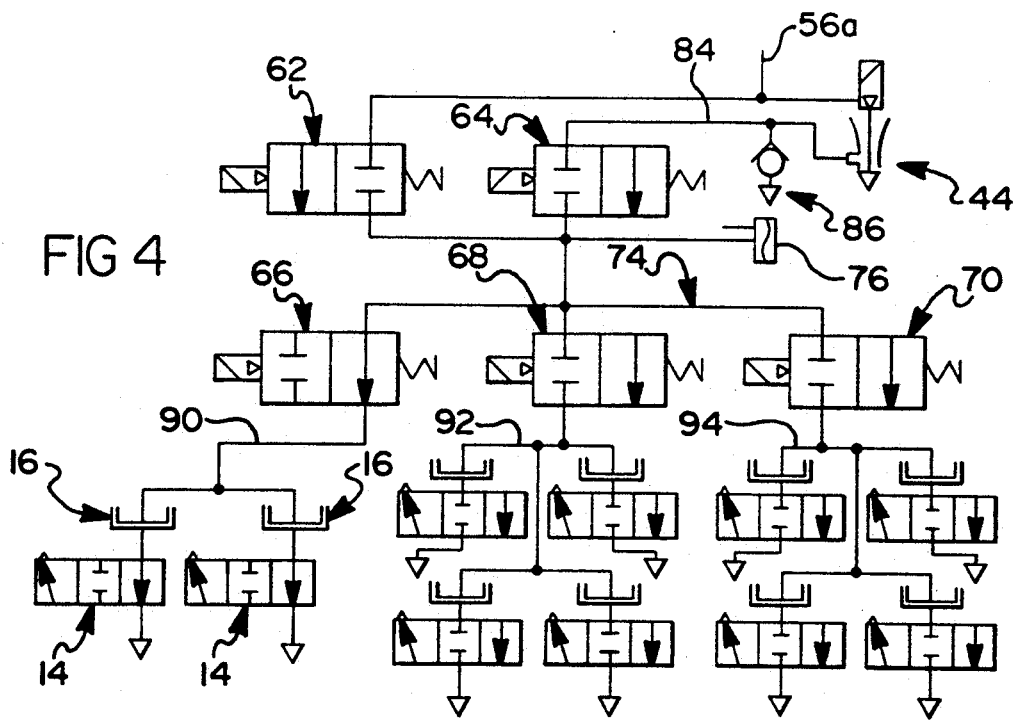
FIG 4
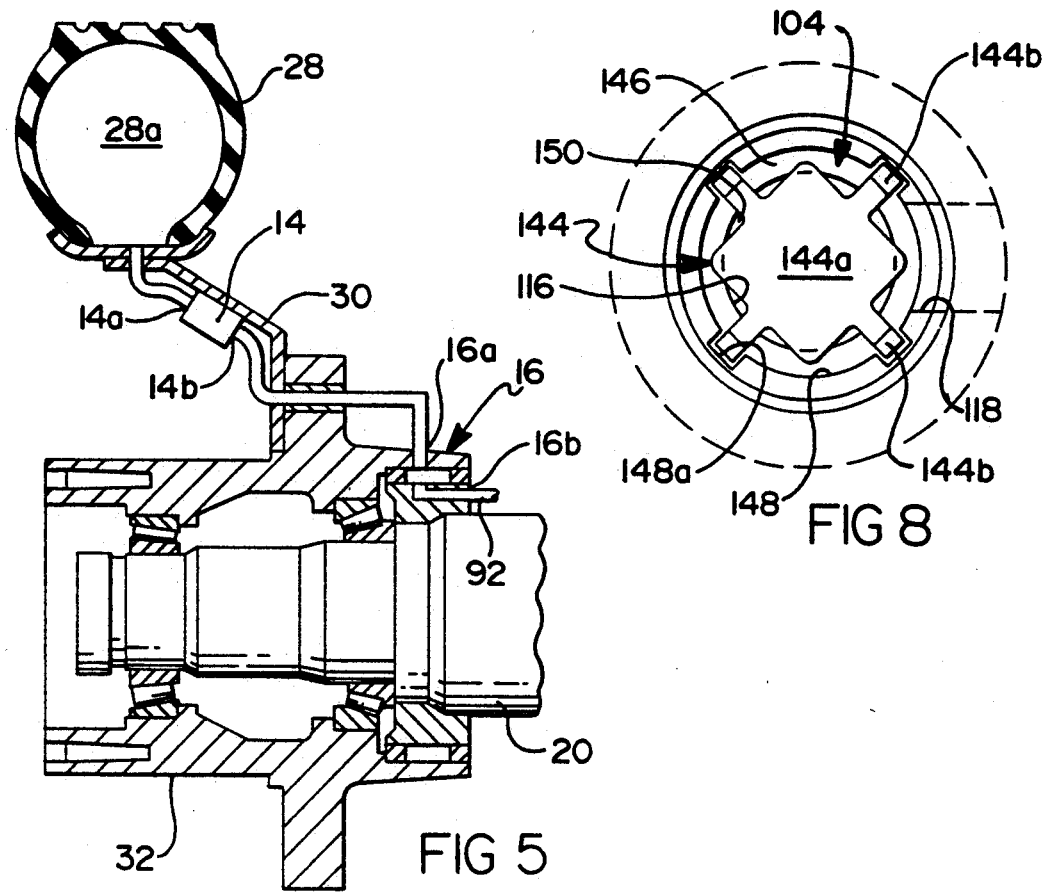
FIG 5
FIG 8

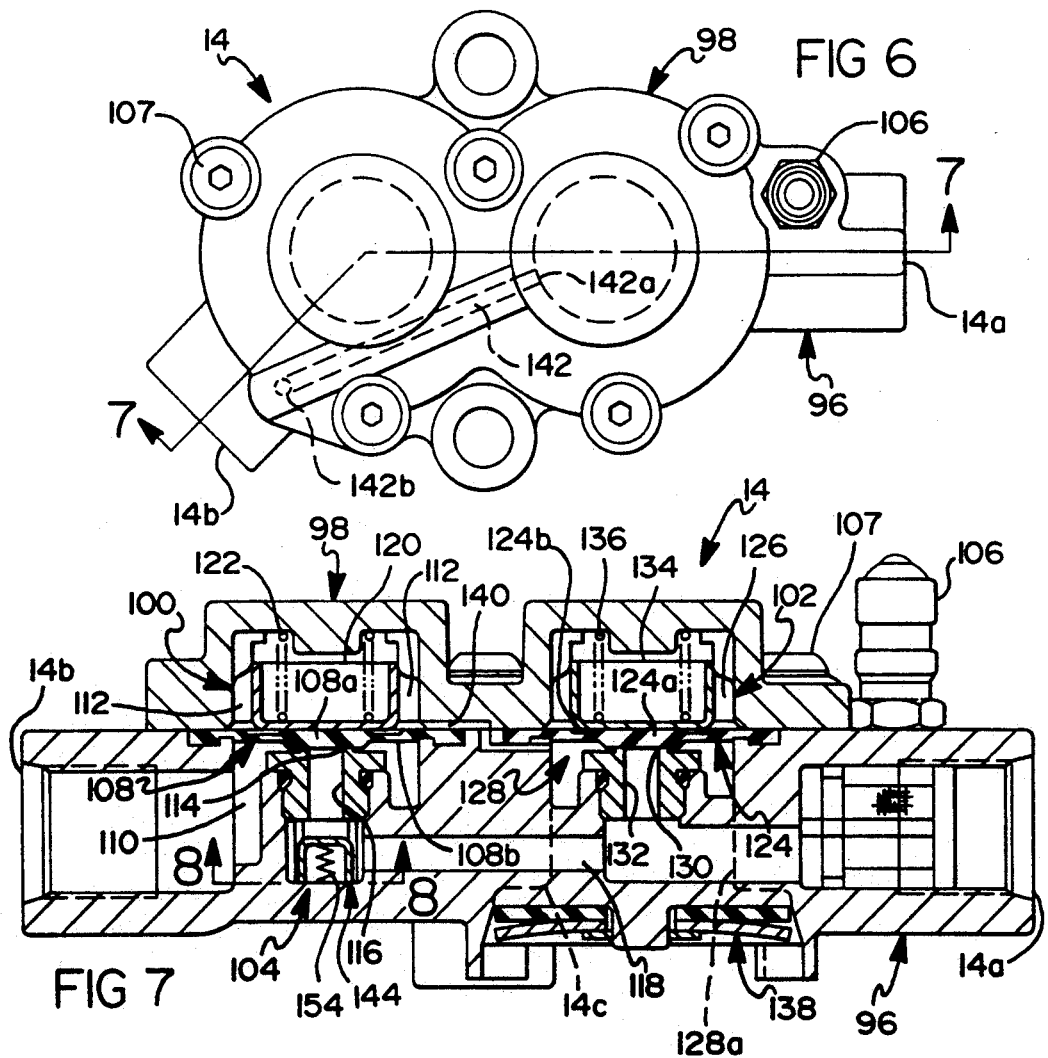
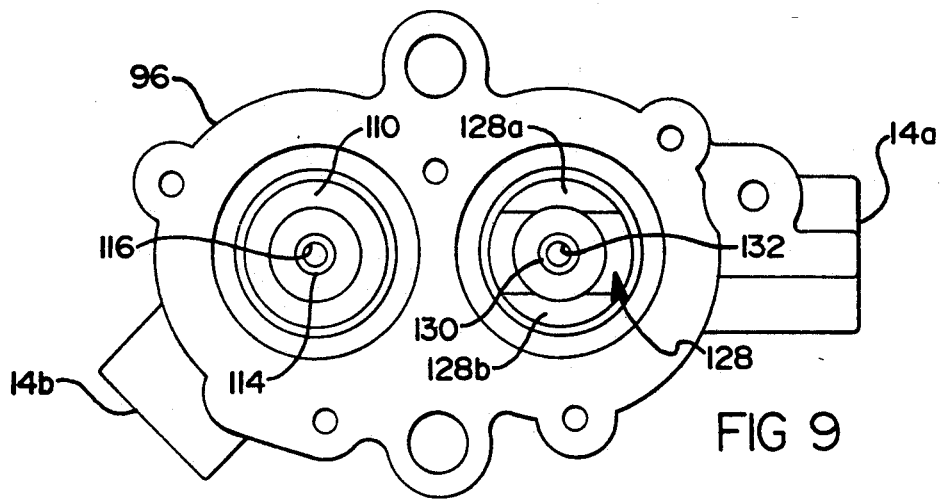

VENT FOR VEHICLE TIRE INFLATION SYSTEM

CROSS REFERENCE TO RELATED APPLICATION

This application is related to U.S. application Ser. No. 07/753,562 filed Sep. 3, 1991 and incorporated herein by reference.

FIELD OF THE INVENTION

The present invention relates to central tire inflation systems (CTI systems), also known as on-board inflation systems and traction systems, wherein the inflation pressure of vehicle tires may be monitored and controlled from a remote location on the vehicle with the vehicle at rest and/or in motion. The invention is particularly concerned with an improved wheel valve for such a system.

DESCRIPTION OF THE PRIOR ART

CTI systems are well known in the prior art as may be seen by reference to U.S. Pat. Nos. 4,619,303; 4,754,792; 4,782,879; 4,825,925; 4,860,579; 4,877,448; 4,883,105; 4,893,664; 4,898,216; 4,917,163; 4,922,946; and 4,924,926. The entire disclosure of each of these patents is incorporated herein by reference.

Several of the CTI systems in the above patents employ a pneumatically controlled wheel valve affixed to each vehicle wheel assembly for effecting tire pressure inflation/deflation and monitoring in response to positive pressure signals from an air control circuit. The positive pressure signals are, of course, supplied to each wheel valve via non-rotating conduits connected at one end to the air control circuit and connected at the other end to a rotary seal assembly which in turn is connected to the associated wheel valve. Such systems have required rather precise control of the positive pressure signals and the wheel valve components which respond to the signals to ensure desired control of inflation/deflation and monitoring. Further, when such systems have required tire deflation air to pass through the rotary seal assembly and the non-rotating conduits before being exhausted to atmosphere, rather large size wheel seals and conduits have been necessary to effect rapid deflation of the tires.

Disadvantages associated with the above mentioned systems and wheel valves employed therein are negated or mitigated by the CTI system and wheel valve disclosed in U.S. Pat. No. 4,922,946. Therein positive pressures are employed to effect tire inflation and monitoring, negative pressures are employed to effect tire deflation, and tire pressure is exhausted at the wheel valve. However, a ball type valving member in the wheel valve of this patent closes during pressure monitoring, whereby the control circuit will monitor false tire pressures, and the valving member may allow leakage of tire air due to minor amounts of contaminates in the system. Further, the wheel valve may not shut-off rapidly due to rather slow venting of positive pressure in the air control circuit.

SUMMARY OF THE INVENTION

An object of the present invention is to provide an inexpensive and reliable means for rapidly venting an air control circuit of a central tire inflation system.

According to a feature of the invention, a system for monitoring and controlling air pressure in a tire of a vehicle comprises: an air control circuit including a pressure source and a vacuum source for respectively providing positive and negative air pressure. A pressure control valve and a vacuum control valve are each selectively movable from a closed position to an open position for respectively connecting a conduit assembly with the positive air pressure and with the negative air pressure via a vacuum passage interposed between the vacuum source and the vacuum control valve. A wheel assembly is rotatably mounted on an axle and a tire chamber is defined by a tire mounted on the wheel assembly. A rotary seal communicates the positive and negative air pressures from a rotary seal non-rotatable port connected to the conduit assembly to a rotatable port thereof. A wheel valve affixed to wheel assembly includes inlet, outlet and exhaust ports, and first and second valving members. The first valving member is for allowing and preventing air communication between the inlet and outlet ports in response respectively to the presence and absence of positive pressure air at the inlet port. The second valving member is for allowing and preventing air communication between the outlet and exhaust ports in response respectively to the presence and absence of negative air pressure at the inlet port. A one-way vent valve is for effecting rapid venting of positive air pressure in the conduit assembly. The vent valve includes an inlet communicating with the vacuum passage, an outlet communication with atmosphere, and a vent valving member. The vent valving member is operative to block venting communication between the vent valve inlet and outlet in response to negative air pressure in the vacuum passage and is operative to allow such venting communication in response to the open position of the vacuum control valve during the presence of positive air pressure in the conduit assembly.

BRIEF DESCRIPTION OF THE DRAWINGS

The central tire inflation system of the present invention is shown in the accompanying drawings in which:

FIGS. 2-4 are schematic illustrations of a portion of the system in FIG. 1 with some of the valves therein positioned for inflation of tires on one axle (FIG. 2), deflation of the tires on the one axle (FIG. 3), and for monitoring the pressure of the tires on the one axle (FIG. 4);

FIG. 5 schematically illustrates an axle assembly wheel end with a wheel valve assembly interposed between a tire air chamber and a rotary wheel assembly; and FIG. 6 is a plain view of a wheel valve assembly schematically illustrated in FIGS. 1-5;

FIG. 7 is an enlarged sectional view of the wheel valve assembly along line 7—7 of FIG. 6;

FIG. 8 is a plain view of a housing body of the wheel valve assembly looking along line 8—8 of FIG. 7; and FIG. 9 is a plan view of a housing body of the wheel valve assembly with a housing cover removed.

DETAILED DESCRIPTION OF THE DRAWINGS

Figure 1:
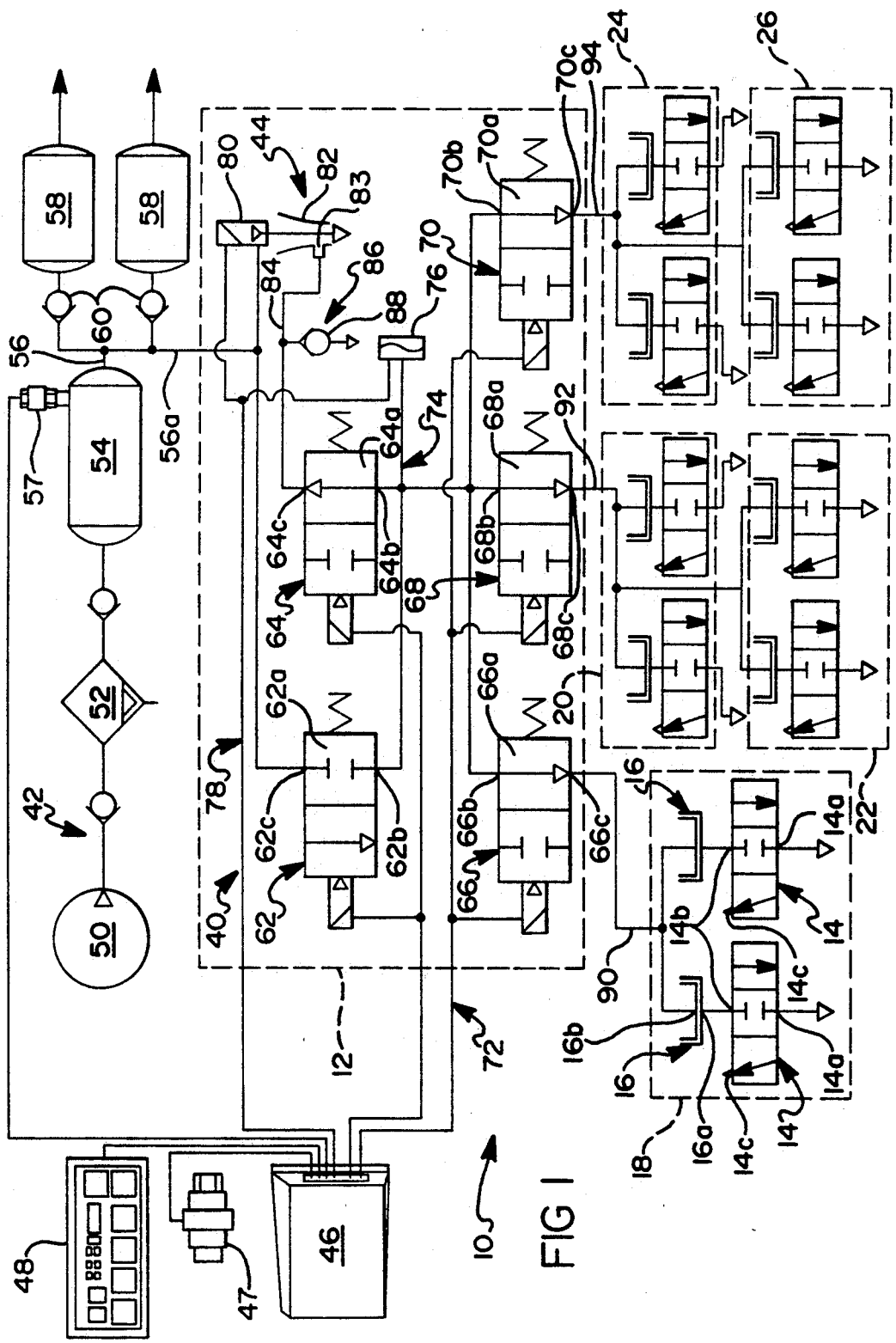
FIG. 1 is a schematic illustration of the system in an off or inactive position.

The schematic of FIG. 1 illustrates a central tire inflation system 10 for a vehicle having a body or chassis represented by phantom line 12, pairs of identical wheel valve assemblies 14 and rotary seal assemblies 16 for a steer axle represented by phantom line 18, for a tandem axle assembly having drive axles represented by phantom lines 20,22 and for (in some applications) trailer axles represented by phantom axles 24,26. Details of the wheel and tire assemblies configured for central tire inflation are well known in the prior art. Herein by way of example, in FIG. 5, is illustrated a partially shown wheel assembly including an inflatable tire 28 and a wheel 30 fixed to a wheel hub 32 rotationally supported on an outboard end of, for example, the drive axle assembly 20. One of the wheel valves 14 is affixed to the wheel with an outlet port 14a thereof connected to an inflatable volume 28a of the tire and an inlet port 14b thereof connected to a rotatable port 16a of a rotary seal assembly 16 having a non-rotatable port 16b connected to a conduit 92 of an air control circuit 40 of system 10.

Vehicle chassis mounted components of system 10 include the air control circuit 40 having a positive pressure air source 42 and a vacuum source 44, a microprocessor-based electronic control unit (ECU) 46, a vehicle speed sensor 47, and a command/display console 48. Herein the positive pressure air source 42 is a vehicle air brake pressure source including a pump 50, an air dryer 52, and a first air tank 54 connected via a conduit 56 to the brake system via tanks 58 and to the air control circuit 40 via a branch conduit 56a. Check valves 60 prevent sudden loss of air pressure in brake tanks 58 in the event of upstream pressure loss.

The air control circuit 40 further includes control valves 62,64 and axle distribution valves 66,68,70. These valves are preferably of the two position-two way, solenoid controlled and pilot air operated type. The valves respectively include valving member 62a,64a,66a,68a,70a which are spring biased to either an open or closed position as shown in FIG. 1 and which are individually moved to the opposite position in response to energization of the associated solenoid by electrical signals from ECU 46 via conductors in a wiring harness 72. Valves 62,64 respectively include ports 62b,64b connected to ports 66b,68b,70b via a conduit assembly 74 which is also connected to a pressure sensor 76 supplying electrical pressure signals to the ECU via a conductor in a wiring harness 78. A port 62c of valve 62 is connected to the positive pressure air source via the branch conduit 56a which is also connected to a normally closed solenoid valve 80 of the vacuum source 44. A vacuum passage or conduit 84 is connected at one end to port 64c of valve 64 and at the other end via a small 82a to a low pressure zone produced by passing air flow source 42 through a venturi like portion of generator 82. The vacuum generator produces a vacuum or negative air pressure in conduit 84 relative to ambient atmospheric air pressure in response to an electrical signal from ECU 46 via a conductor in the wiring harness 78 energizing solenoid valve 80 to the open position. Conduit 84 is also connected to a one-way vent valve 86 for effecting rapid venting of positive air pressure in conduit 84 for reasons explained hereinafter. Vent valve 86 includes a valving member 88 drawn to a closed position in response to negative air pressure in conduit 84 and moved to an open position in response to positive pressure air in the conduit. A port 66c of valve 66 is connected to the rotary seal assemblies 16 and wheel valve assemblies of steer axle 18 via a conduit 90. A port 68c of valve 68 is connected to the rotary seal and wheel valve assemblies of drive axles 20,22 via a conduit 92. A port 70c of valve 70 is connected to the rotary seal and wheel valve assemblies of trailer axles 24,26 via a conduit 94.

Figure 2:
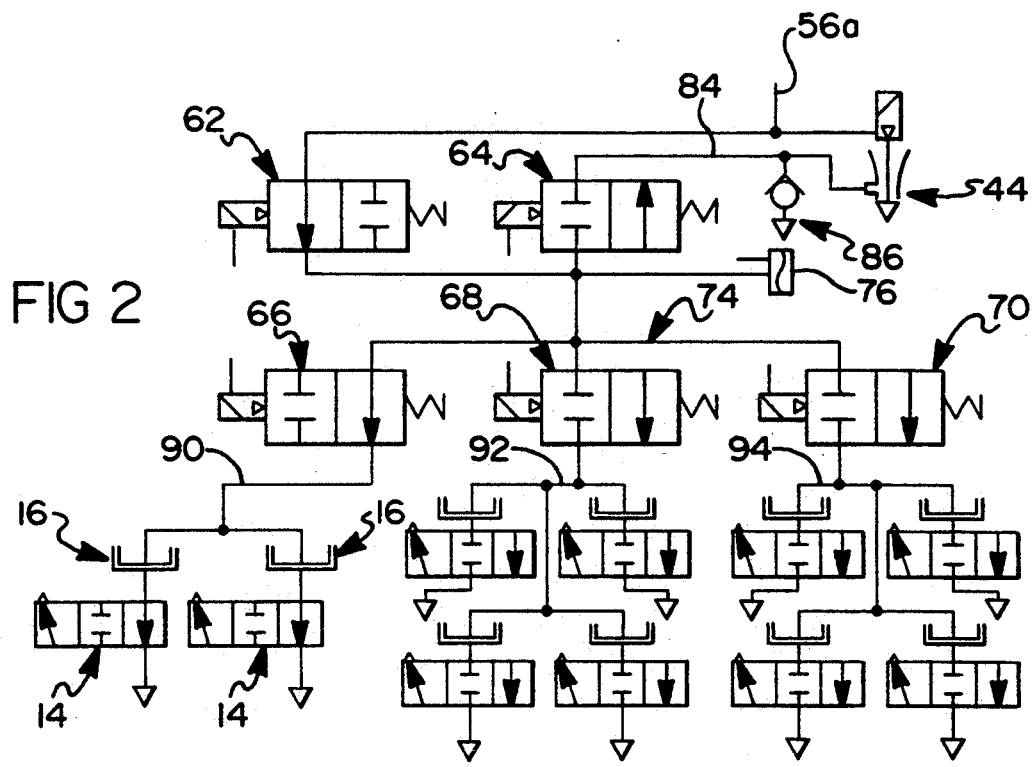
Figure 3:
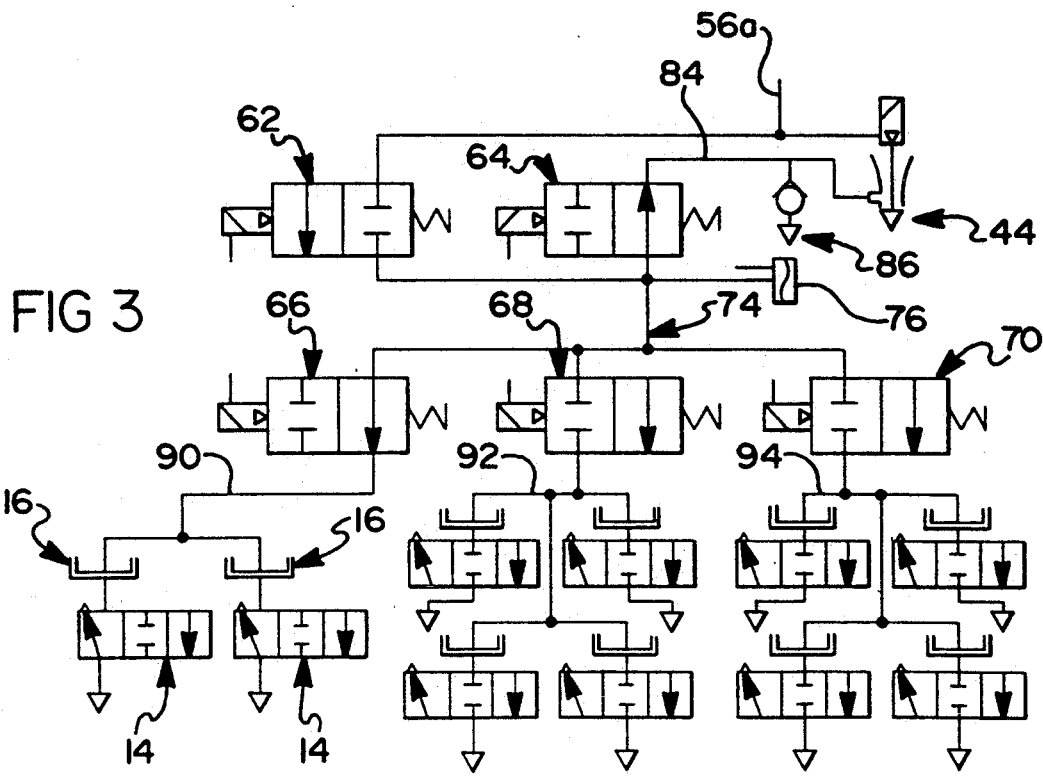

Wheel valve assemblies 14, which herein are functionally and structurally the same, are pilot air controlled and operated with valving means therein spring biased to the closed position. With reference to steer axle 18 in FIGS. 1-4, the wheel valve valving means assumes the closed position of FIG. 1 when the air pressure at inlet port 14b is substantially atmospheric, assumes an open position connecting inlet port 14b with outlet port 14a as shown in FIGS. 2 and 4 when the air pressure in the inlet port 14b is a positive pressure, and assumes an exhaust position connecting outlet port 14a with an exhaust port 14c as shown in FIG. 3 when the air pressure in inlet 14b is a negative pressure.

Basic Operation

CTI system 10 is designed to automatically maintain tire pressure at or near selected pressure in accordance with ECU 46 programming. The vehicle operator has the capability of commanding the system to decrease or increase tire pressure of selected axles for respectively improving tire traction or increasing load carrying capacity of the vehicle by merely pushing the appropriate switch or command/display console 48. The system automatically increases tire pressure if the vehicle speed exceeds a predetermined speed for the selected tire pressure, and alerts the vehicle operator of tire pressure leakage and of system malfunction. The microprocessor-based ECU 46 is readily programmed by known methods to perform pressure check sequences and inflate/deflate sequences in accordance with basic algorithms.

When the vehicle ignition is energized and pressure switch 57 is closed, ECU 46 initiates a pressure check sequence of the tires on each of the axles. If tire pressure of any of the axles is found to be a predetermined amount less than command pressure, an inflation sequence is initiated for the axle or axles effected. During vehicle operation, the ECU automatically initiates periodic pressure check sequences. When enhanced or maximum traction is required, the vehicle operator may command reduced tire pressure for all or selected axles by pushing appropriate switches on the command/display console 48; if the vehicle speed is greater than a predetermined amount for the selected reduced pressure, the ECU will not initiate the appropriate pressure deflation sequence.

With control valves 62,64, axle distribution valves 66,68,70 and wheel valves 14 in the positions of FIG. 1 and with vacuum source solenoid valve 80 closed, conduit assembly and each of the rotary seals 16 are vented to atmosphere through vacuum generator 82 and vent valve 86 via control valve 64 and vacuum 84.

Since pressure check and inflation/deflation sequences are basically the same for the tires on the steer, drive and trailer axles, description of the sequences for the steer axle should suffice for all of the axles. With reference first to FIG. 2 and then to FIG. 4, the pressure check sequence is initiated for the steer axle by energizing valves 64,68,70 to the closed positions and momentarily energizing control valve 62 to the open position to provide positive air pressure sufficient to move the valving means of wheel valve assemblies 14 to the open positions of FIG. 2. De-energization of control valve 62 returns the valving member thereof to the closed position. With valve 62 closed and valves 66,14 open, the pressure in manifold soon equalizes to tire pressure. The ECU reads this pressure via electrical signals from sensor 76 and initiates inflate/deflate sequences as required. If no further sequence is required, control valve 64 is de-energized by the ECU to effect its open position, thereby connecting the wheel valve assembly inlet ports to the vent through vacuum generator 82 and vent valve 86. Vent valve 86 provides a substantially greater flow area path to atmosphere than does orifice 83, thereby providing rapid reduction of the positive air pressure at inlet ports 14b of the wheel valves for effecting rapid movement of the wheel valve valving means to the closed positions of FIG. 1. Without vent valve 86 in the system, back flow of air from the tires may maintain a sufficiently high positive pressure at inlet port 14a to delay closing of the valving means, thereby causing unwanted loss of tire pressure, increasing the time rotary seal assemblies are subjected to the deteriorating of pressurization and increasing the time required to effect sequences.

FIG. 2 illustrates the valve positions during an inflation sequence which is terminated in the same manner as the pressure check sequence.

A tire deflation sequence is initiated by energizing valve 68,70 to the closed position and energizing vacuum source solenoid 80 to the open position to provide a negative air pressure at inlet ports 14b for moving the wheel valve valving means to positions connecting outlet ports 14a to exhaust ports 14c as illustrated in FIG. 3. The deflation sequence is terminated by de-energizing vacuum source solenoid valve 80 to the closed position.

Wheel Valve Assembly 14

Wheel valve assembly 14, as shown in FIGS. 6-9 comprises a housing including a housing body 96 and a housing cover 98, the inlet, outlet and exhaust ports, a first diaphragm valve device 100 operative to allow and prevent air communication between the inlet and outlet ports, a second diaphragm valve device 102 operative to allow and prevent air communication between the outlet and exhaust ports, a third valve device 104 for restricting air flow from the outlet port to the inlet port, and a manual fill valve 106 for manually increasing/decreasing air pressure to the tire or tires connected to the outlet of each to the wheel valve assembly. The housing body and cover are secured together by a plurality of fasteners 107.

First valve device 100 includes a flexible diaphragm 108 dividing a first cavity defined by the housing body and cover into a first pilot chamber 110 in continuous communication with the inlet port and a vented spring chamber 112, a valving member 108a defined by a center portion of the diaphragm, a valve seat 114 disposed at one end of a passage 116 communicating at its other end with the outlet port via a passage 118, a rigid cup shaped member 120 slidably disposed in spring chamber 112 and biased against the diaphragm by a spring 122. Spring 122 biases valve member 108a into a closed position or sealing engagement with valve seat 114 with a force sufficient to maintain the sealing engagement for the highest contemplated tire pressure. Valving member 108a is moved to an open position against the force of spring 122 in response to a predetermined minimum positive air pressure in pilot chamber 110 from the inlet port acting on diaphragm surface 108b.

Second valve device 102 includes a flexible diaphragm 124 dividing a second cavity defined by the housing body and cover into a second pilot chamber 126 and an exhaust chamber 128, a valving member 124a defined by a center portion of diaphragm 124, a valve seat 130 disposed at one end of a passage 132 communicating at its other end with the outlet port, a rigid cup shaped member 134 slidably disposed in second pilot chamber 126 and biased against diaphragm 124 by a spring 136. Exhaust chamber 128 continuously communicates with atmosphere via passages 128a, 128b which extend on opposite sides of passage 118 to exhaust port 14c. A flexible cover assembly 138, prevents entry of foreign matter into the exhaust port. As seen in FIG. 9, passages 128a, 128b have a somewhat crescent shape. Passage 128a is indicated by phantom lines in FIG. 7. Exhaust chamber 128 also is in continuous communication with spring chamber 112 of the first valve device via a somewhat Z-shaped passage 140. With reference to FIG. 6, second pilot chamber 126 is in continuous communication with the inlet port via a passage 142 shown in phantom lines. An end 142 of the passage opens into chamber 126 and an end 142b opens in to the inlet port. Spring 136 biases valve member 124a into a closed position or sealing engagement with valve seat 130 with a force sufficient to maintain the sealing engagement for the highest contemplated tire pressure. Valving member 124a is moved to an open position against force of spring 136 in response to a predetermined minimum negative pressure from the inlet port acting on diaphragm surface 124b.

Third valve device 104, which may be structurally of many different designs, is disposed in series between first valve device 100 and the outlet port. Device 104, as seen in FIGS. 7 and 8, includes a valving member 144 having an open or first position, as shown in FIG. 7, which allows substantially unrestricted flow of air from the inlet port to the outlet port, and having a partially closed or second position which allows only restricted flow of air from the outlet to the inlet. Valving member 144 includes a rectangular portion 144a having a plurality of guide legs 144b extending therefrom at right angles, and a circular valve seat 146 disposed at the adjacent end of passage 116 for cooperating surfaces at the corners of the rectangular portion. Legs 144b are slidably received in guide recesses 148a in a well 148 of diameter greater than rectangular portion 144a to allow free flow therearound to passage 118. When air flow is from the outlet port to the inlet port, as may occur during a pressure check sequence and/or when air control circuit 40 is being vented to atmosphere for closing valve device 100, the flow of air around valving member 144 moves the valving member into contact with valve seat 146 such that a plurality of small through passages 148 are formed to allow restricted air communication between the inlet and outlet port while the first valve device is open. Small passage 148 ensures sufficient air communication between the inlet and outlet ports for rapid pressure equalization of tire pressure in conduit assembly 74 for accurate pressure check reading. The small through passages also restrict air flow from the outlet port to the inlet port during venting of air control circuit 40 to ensure rapid positive pressure drop in the first pilot chamber for effecting quick closing of the first valve device. Valving member 144 may be biased to the closed position by a spring 154 proving a small biasing force.

A preferred embodiment of the invention has been disclosed for illustrative purposes. Many variations and modifications of the preferred embodiment are believed to be within the spirit of the invention. The following claims are intended to cover the inventive portions of the preferred embodiment and variations and modifications within the spirit of the invention.

What is claimed is:

1. A system for monitoring and controlling air pressure in a tire of a vehicle; the system comprising:

an air control circuit including a pressure source and a vacuum source respectively for providing positive and negative air pressures relative to an ambient air pressure, pressure and vacuum control valves each selectively movable from a closed position to an open position for respectively connecting a conduit means with the positive air pressure via a pressure passage interposed between the pressure source and the pressure control valve and with the negative air pressure via a vacuum passage interposed between the vacuum source and the vacuum control valve;

at least one wheel assembly rotatably mounted on an axle assembly and a tire chamber defined by a tire mounted on the wheel assembly;

a rotary seal assembly for communicating the positive and negative air pressures from a non-rotatable port thereof connected to the conduit means to a rotatable port thereof;

a wheel valve assembly having a housing affixed for rotation with each wheel assembly and including an inlet port and an outlet port, an exhaust port, a first valving means for allowing and preventing air communication between the inlet and outlet ports in response respectively to the presence and absence of positive air pressure at the inlet port, a second valving means for allowing and preventing air communication between the outlet and exhaust ports in response respectively to the presence and absence of negative air pressure at the inlet port; and a one-way vent valve for effecting rapid venting of positive air pressure in the conduit means, the vent valve including an inlet communicating with the vacuum passage, an outlet communicating with the ambient air pressure, a vent valving member operative to block venting communication between the vent valve inlet and outlet in response to negative air pressure in the vacuum passage and operative to allow such venting communication in response to the open position of the vacuum control valve during the presence of positive air pressure in the conduit means.

2. The system of claim 1, wherein:

the wheel valve assembly includes a third valve device in the housing disposed in series between the first valving means and the outlet port, the third valve device including a third valving means movable between first and second positions during the position of the first valving means allowing air communication between the inlet and outlet ports, the third valving means movable to the first position thereof for allowing substantially unrestricted air flow from the inlet port to the outlet port in response to air flow from the inlet port to the outlet port, and the third valving means movable to the second position for allowing only restricted flow of air from the outlet port to the inlet port in response to air flow from the outlet port to the inlet port.

* * * * *